United States Patent
Ando et al.

(10) Patent No.: US 6,596,992 B2
(45) Date of Patent: Jul. 22, 2003

(54) METHOD OF OPERATING SCANNING PROBE MICROSCOPE

(75) Inventors: Kazunori Ando, Chiba (JP); Kazutoshi Watanabe, Chiba (JP); Yoshiteru Shikakura, Chiba (JP); Masaki Tsuchihashi, Chiba (JP); Takehiro Yamaoka, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/017,123

(22) Filed: Dec. 14, 2001

(65) Prior Publication Data
US 2002/0088937 A1 Jul. 11, 2002

(30) Foreign Application Priority Data
Dec. 15, 2000 (JP) .......................... 2000-381555

(51) Int. Cl.[7] ................................ G21K 7/00
(52) U.S. Cl. ................. 250/306; 250/307; 250/311; 73/105
(58) Field of Search ............... 250/306, 307, 250/311; 73/105

(56) References Cited

U.S. PATENT DOCUMENTS

| | | | | |
|---|---|---|---|---|
| 4,724,318 A | * | 2/1988 | Bennig | 250/306 |
| 5,077,473 A | * | 12/1991 | Elings et al. | 250/306 |
| 5,298,975 A | * | 3/1994 | Khoury et al. | 356/624 |
| 5,333,495 A | * | 8/1994 | Yamaguchi et al. | 73/105 |
| 5,376,790 A | * | 12/1994 | Linker et al. | 250/306 |
| 5,496,999 A | * | 3/1996 | Linker et al. | 250/306 |
| 5,624,845 A | * | 4/1997 | Wickramasinghe et al. | 435/287.2 |
| 5,656,809 A | * | 8/1997 | Miyashita et al. | 250/225 |
| 5,744,704 A | * | 4/1998 | Hu et al. | 73/105 |
| 5,880,360 A | * | 3/1999 | Hu et al. | 73/105 |
| 5,965,881 A | * | 10/1999 | Morimoto et al. | 250/234 |
| 6,006,594 A | * | 12/1999 | Karrai et al. | 73/105 |
| 6,073,485 A | * | 6/2000 | Kitamura | 73/105 |
| 6,078,174 A | * | 6/2000 | Mukasa et al. | 324/244 |
| 6,246,054 B1 | * | 6/2001 | Toda et al. | 250/306 |
| 6,279,389 B1 | * | 8/2001 | Adderton et al. | 73/105 |
| 6,423,967 B1 | * | 7/2002 | Shido et al. | 250/306 |

* cited by examiner

Primary Examiner—John R. Lee
Assistant Examiner—Erin-Michael Gill
(74) Attorney, Agent, or Firm—Adams & Wilks

(57) ABSTRACT

In the first operation, the cantilever is oscillated at a frequency which is at opposite sides of a frequency band having a half value of an oscillation frequency f and amplitude A on a dependent curve (Q-curve). The cantilever oscillating frequency is far from an oscillation frequency (near a resonance point) where the cantilever is slow to damp, which enables the cantilever to quickly damp in accordance with a variation of a transient oscillation frequency after the probe comes into contact with the specimen, and allows the probe to follow the uneven surface state of the specimen.

20 Claims, 4 Drawing Sheets

Q-CURVE 14
AMPLITUDE A
f1  ف2  Amax
Amax/2
OSCILLATING FREQUENCY f
FREQUENCY BAND HAVING HALF VALUE (A) FREE OSCILLATION  (B) TRANSIENT STATE DURING INTERACTION FROM SPECIMEN SURFACE

UNEVEN SURFACE STATE DATA
OBTAINED BY MEASUREMENT

UNEVEN SURFACE STATE OF SPECIMEN

WAVEFORM OF VOLTAGE APPLIED
TO CANTILEVER OSCILLATING
MEANS

OPTICAL POSITION OUTPUT
SIGNAL ISSUED BY OPTICAL
POSITION SENSOR

TIME

METHOD OF OPERATING SCANNING PROBE MICROSCOPE

BACKGROUND OF THE INVENTION

The present invention relates to a scanning probe microscope comprising a cantilever having a minute probe at one end thereof, a laser radiating laser beams to a laser beam reflecting surface of the cantilever, an optical position sensor detecting positions of reflected laser beams, specimen moving means moving a specimen, and cantilever oscillating means periodically oscillating the cantilever with a predetermined amplitude. The scanning probe microscope performs a first operation in which if the optical position sensor detects a reduced amplitude when the probe of the cantilever comes into contact with the specimen, uneven surface state data of the specimen are obtained on the basis of a control amount of upward and downward movements of the specimen moving means which is moved upward or downward in order to maintain the reduced amplitude constant, and a second operation in which physical action force data of the specimen are obtained by keeping the probe spaced from the specimen by a predetermined amount on the basis of the uneven surface state data obtained by the first operation.

In the related arts a scanning probe microscope comprises a cantilever having a minute probe at one end thereof, a laser radiating laser beams to a laser beam reflecting surface of the cantilever, an optical position sensor detecting positions of reflected laser beams, specimen moving means moving a specimens and cantilever oscillating means periodically oscillating the cantilever with a predetermined amplitude. The scanning probe microscope performs a first operation in which if the optical position sensor detects a reduced amplitude when the probe of the cantilever comes into contact with the specimen, uneven surface state data of the specimen are obtained on the basis of a control amount of upward and downward movements of the specimen moving means which is moved upward or downward in order to maintain the reduced amplitude constant, and a second operation in which physical action force data of the specimen are obtained by keeping the probe spaced from the specimen by a predetermined amount on the basis of the uneven surface state data obtained by the first operation. In the first operation, the cantilever is oscillated by applying a frequency near a resonant point of the dependent curve (Q-curve) of the cantilever oscillating frequency and the amplitude. In the second operation, physical operation data of the specimen are obtained by keeping the probe spaced by a predetermined extent from the specimen on the basis of the uneven surface state data obtained by the first operation.

The scanning probe microscope further comprises a phase sensor, which detects a signal generated in response to a time delay (phase) in the oscillation of the cantilever caused by interactions of the specimen surface and the probe. The scanning probe microscope measures differences in physical properties of the specimen surface on the basis of a phase measured near a resonance point of the Q-curve.

With the scanning probe microscope of the related art, the cantilever oscillating frequency is set near the resonance point of the dependent curve (Q-curve) of the cantilever oscillating frequency and amplitude during the first operation, Therefore, the cantilever is quickly oscillated but is slow to damp. Specifically, even when it is subject to the interaction of the specimen, the probe takes time to damp, and does not make its amplitude variation constant immediately. This will lead to a delay in the control operation of the specimen moving means, and an operation amount of the specimen moving means is determined with a delay. Data concerning uneven states of the specimen cannot be accurately obtained on the basis of the control amount of the specimen moving means. It is also possible to accelerate the upward and downward movements of the specimen moving means. However, there is a problem of an oscillation phenomenon in which a direction of amplitude variations and control of the upward and downward movements are not in agreement. Specifically, since there is no air resistance in a a vacuum, the cantilever is difficult to damp, and it takes time to reach the target amplitude when there is interaction with a specimen. This means that the control operation is further delayed, and that uneven surface states of the specimen cannot be measured.

In the second operation, the probe is kept spaced from the specimen on the basis of the uneven surface state data obtained in the first operation, However, since the uneven surface state data are not accurately obtained, it is not possible to obtain physical property data with the probe spaced from the specimen.

The present invention is intended to facilitate, in a first operation, damping transient oscillation variations of the cantilever probe coming into contact with the specimen by setting opposite sides of a frequency band, which is a half value of a dependent curve (Q-curve) of a cantilever oscillating frequency and amplitude, as a cantilever oscillating frequency, and by keeping the cantilever oscillating frequency far from an oscillating frequency (near a resonance point) where the cantilever is slow to damp. Specifically, the invention aims at performing measurements in a vacuum where there is no air resistance. Further, in the second operation, the probe is maintained accurately spaced with a predetermined extent from the specimen surface on the basis of the uneven surface state data obtained in the first operation, so that physical properties of the specimen surface can be accurately measured.

SUMMARY OF THE INVENTION

In order to overcome the foregoing problems, the present invention is intended to facilitate, in a first operation, damping transient oscillation variations of the cantilever probe coming into contact with a specimen by setting opposite sides of a frequency band, which is a half value of a dependent curve (Q-curve) of a cantilever oscillating frequency and amplitude, as a cantilever oscillating frequency, and by keeping the cantilever oscillating frequency far from an oscillating frequency (near a resonance point) where the cantilever is slow to damp. Specifically, the invention aims at performing measurements in a vacuum where there is no air resistance. Further, in the second operation, the probe is maintained accurately spaced with a predetermined extent from the specimen surface on the basis of the uneven surface state data obtained in the first operation, so that physical properties of the specimen surface can be accurately measured.

BRIEF DESCRIPTION OF TIM DRAWINGS

FIG. 1 schematically shows how uneven surface states of the specimen are measured using the scanning probe microscope.

FIG. 2 schematically shows oscillations of the cantilever.

Figure 8:
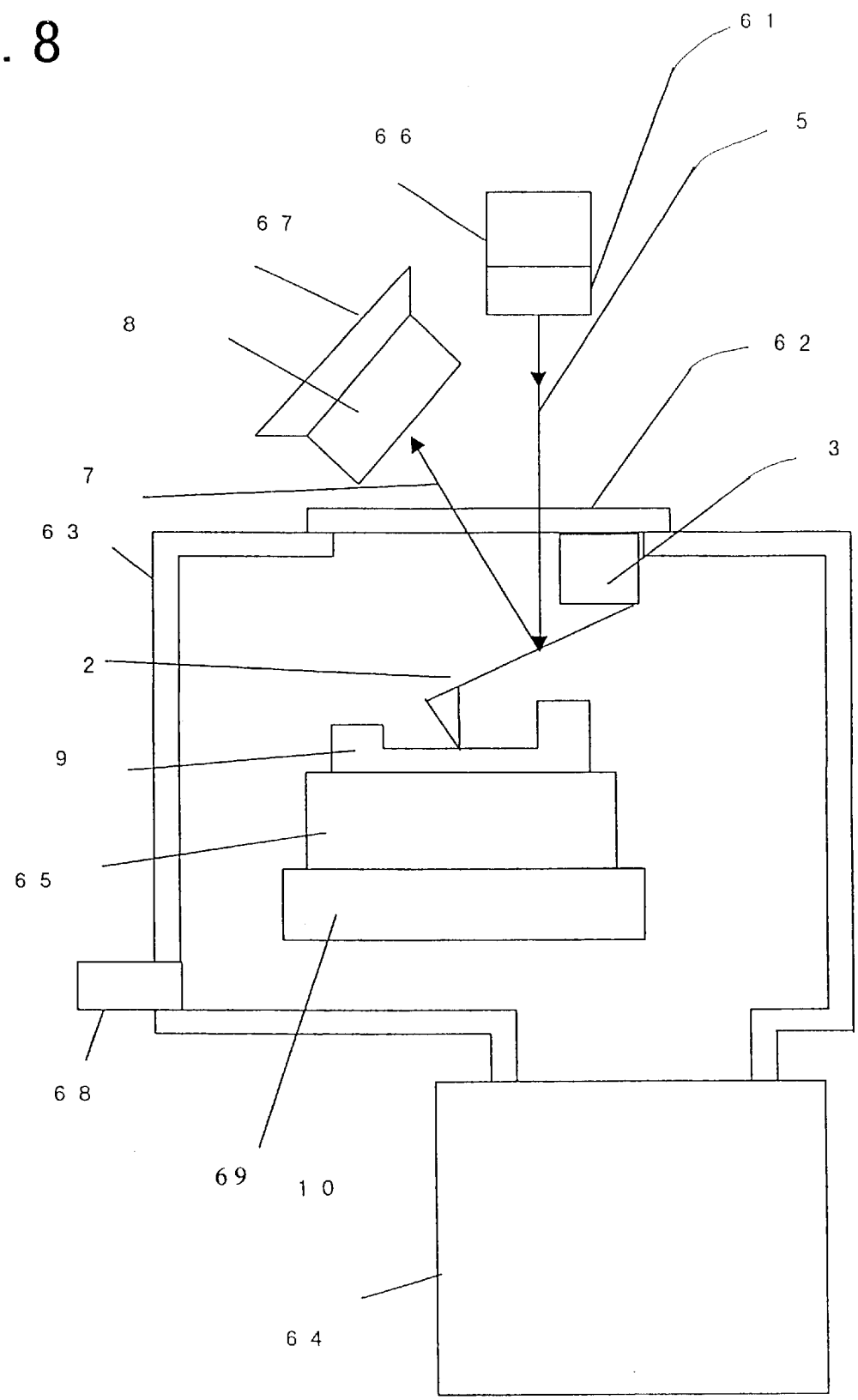

FIG. 8 schematically shows how uneven surface state and distribution of physical properties of the specimen surface are measured using the scanning probe microscope.

DESCRIPTION OF REFERENCE NUMERALS

1 . . . probe
2 . . . cantilever
3 . . . cantilever oscillating means
4 . . . laser beam reflecting surface
5 . . . laser beams
7 . . . reflected laser beams
8 . . . optical position sensor
9 . . . specimen
10 . . . specimen moving means
11 . . . scanning operation
12 . . . upward and downward movements
13 . . . oscillations
14 . . . resonance point
21 . . . bump on specimen
61 . . . laser
62 . . . window
63 . . . vacuum container
64 . . . vacuum pump means
66 . . . laser moving means
67 . . . optical position sensor moving means
68 . . . gas introduction
69 . . . specimen stand moving means
B, C, D . . . positions where reflected laser beams reach optical position sensor
A, A0, A1, A2 . . . amplitudes of cantilever
A-max . . . amplitude of resonance point on Q-curve
f1, f2 . . . frequencies having a half amplitude of resonance point of Q-curve
V1, -V1 . . . voltages applied to cantilever oscillating means
W1, W2 . . . optical position output signal at optical position sensor

DETAILED DESCRIPTION OF THE INVENTION

According to the invention, a scanning probe microscope comprises a cantilever having a minute probe at one end thereof, a laser radiating laser beams to a laser beam reflecting surface of the cantilever, an optical position sensor detecting positions of reflected laser beams, specimen moving means moving a specimen, and cantilever oscillating means periodically oscillating the cantilever with a predetermined amplitude. The scanning probe microscope performs a first operation in which if the optical position sensor detects a reduced amplitude when the probe of the cantilever comes into contact with the specimen, uneven surface state data of the specimen are obtained on the basis of a control amount of movements of the specimen moving means which is moved upward or downward in order to maintain the reduced amplitude constant, and a second operation in which physical action force data of the specimen are obtained by keeping the probe spaced by a predetermined extent from the specimen on the basis of the uneven surface state data obtained by the first operation. In the first operation, the uneven surface state data are obtained by oscillating the cantilever with an oscillation frequency outside a frequency band which is a half value of a dependent curve (Q-curve) of the cantilever oscillating frequency and the amplitude. In the second operation, the cantilever is oscillated with a frequency near a resonant point of the dependent curve (Q-curve) of the cantilever oscillating frequency and the amplitude.

[Embodiment]

Figure 1:
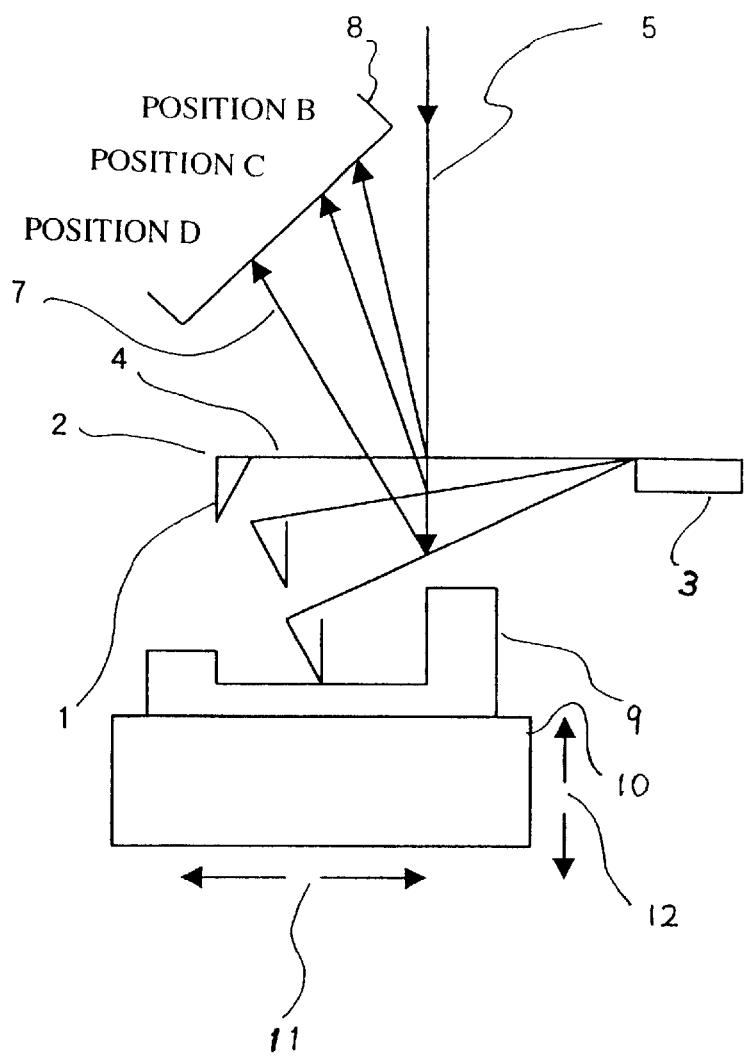
Figure 2:
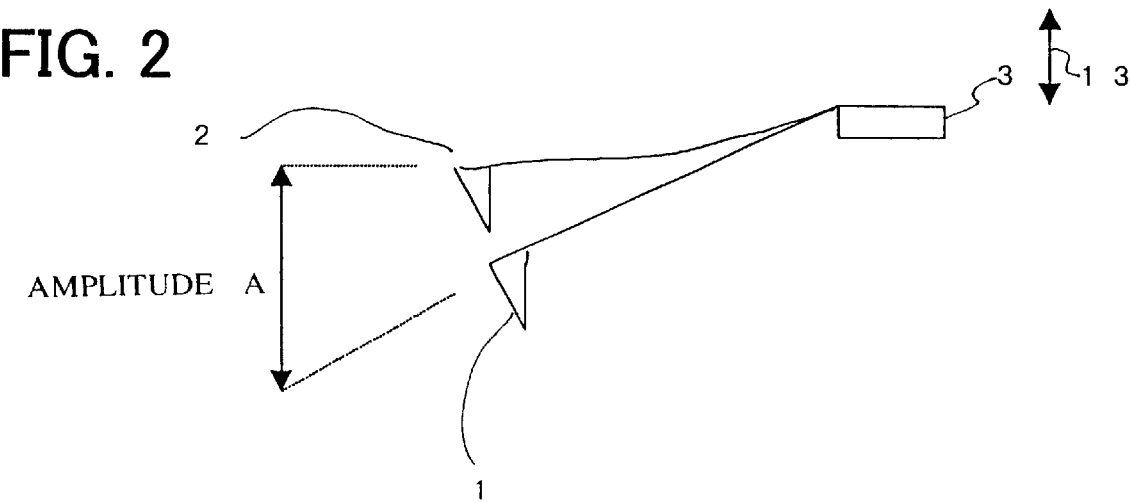
Figure 3:
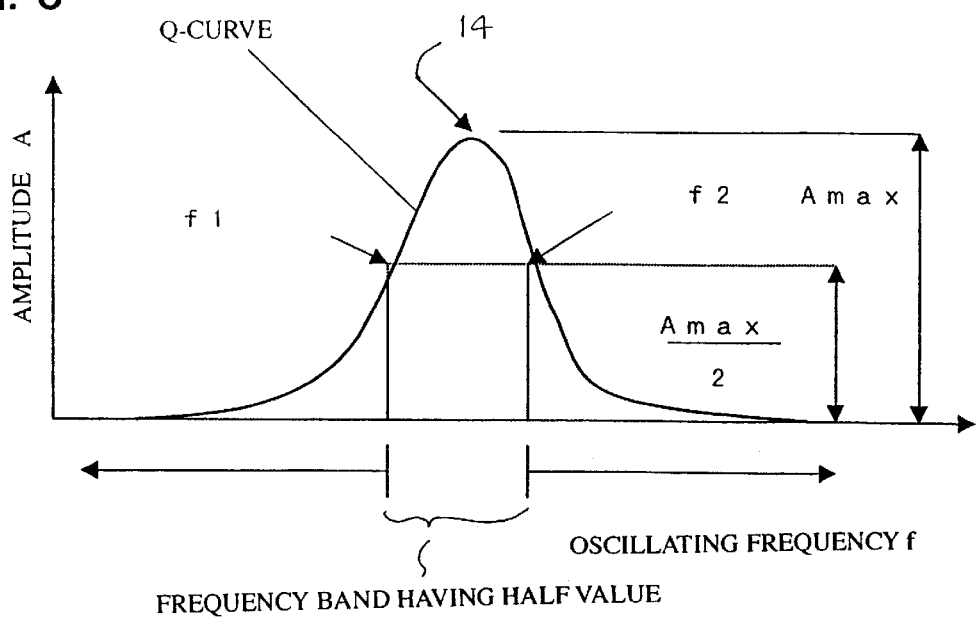
FIG. 3 shows the dependent curve (Q-curve) of the amplitude and oscillating frequency of the cantilever, and a range of the cantilever oscillating frequency according to the invention.

The invention will be described with reference to an embodiment shown in the accompanying drawings. FIGS. 1 to 3 schematically show a measurement performed by a scanning probe microscope of the invention.

It is assumed that a specimen has an uneven surface as shown in FIG. 1. A cantilever 2 having a probe 1 is attached to cantilever oscillating means 3. Laser beams S are radiated onto a laser beam reflecting surface 4. Reflected laser beams 7 are detected as positions of an optical position sensor 8. The cantilever oscillating means 3 oscillates the cantilever 2 in order to move the probe 1 upward or downward. When the probe 2 comes into contact with the surface of a specimen 9, the reflected laser beams reach the position D of the optical position sensor. When the probe leaves from a dent of the specimen and moves upward to its maximum height, the reflected laser beams reach a position B of the optical position sensor. If the probe is in contact with or out of contact from the dent, the amplitude of the cantilever is derived as a difference between the positions D and B. Thereafter, when moved to the left by a scanning operation 11 of the specimen moving means 10, the probe comes into contact with or is out of contact from a bump. The reflected laser beans reach a position C of the optical position sensor when the probe is in contact with the bump. conversely, the reflected laser beams reach the position B while the probe is out of contact from the bump.

When the probe oscillates to and from the bump of the specimen, the amplitude of the cantilever is obtained as the difference between the positions C and B. The uneven surface state of the specimen can be measured by detecting differences between the positions of the optical position sensor where the reflected laser beams reach. Further, the upward and downward movements 12 of the specimen moving means 10 may be controlled in order to make the difference between the positions, where the reflected beams reach the optical position sensor, constant. The uneven surface state data of the specimen may be obtained on the basis of a control amount of the upward and downward movements. Still further, it is preferable that the probe be brought into contact with the specimen with as small and as constant force as possible, which protects the probe and the specimen against damage. Usually, the latter method has been adopted.

FIG. 2 schematically shows the oscillation of the cantilever which is attached to the cantilever moving means 3. The cantilever moving means 3 is constituted by a piezoelectric element, to which a constant voltage is periodically applied. The piezoelectric element generates vertical oscillations 13 in order to oscillate the cantilever 2, which oscillates with a certain amplitude A. The amplitude A depends upon the voltage applied to the piezoelectric element and the oscillation frequency of the piezoelectric element. Even if the applied voltage is constant, the amplitude A largely depends upon the oscillation frequency.

A graph in FIG. 3 shows a difference between a cantilever oscillating frequency in the first operation of the present invention and a lever oscillating frequency in the related art. The ordinate denotes the amplitude A of the cantilever while the abscissa denotes the cantilever oscillating frequency. As the oscillating frequency f is increased from a low frequency, the amplitude A becomes maximum, i.e. A max, at a certain frequency. If the oscillating frequency f is further increased, the amplitude A becomes smaller. The frequency at which the amplitude A is at its maximum depends upon the material, length, depth and width of the cantilever. A frequency dependent curve of the amplitude A is called a "Q-curve". A peak of the Q-curve is a resonance point 14. The oscillating frequency at the resonance point is a resonance frequency. When oscillated with a frequency in front of or behind the resonance frequency (near the resonance point 14), the cantilever is quickly oscillated but is slow to damp. In such a case, even if the same constant voltage is applied, the amplitude A of the cantilever becomes larger and is quickly oscillated, but takes time to damp. If the probe is affected by the specimen, the cantilever is slow to damp, so that the amplitude A of the cantilever does not become a target value, In the related art, the cantilever is oscillated at the frequency near the resonance point because ease of oscillation is preferred.

It is assumed here that A-max denotes height (amplitude) of the resonance point 14, and that frequencies f1 and U on the Q-curve are a half of A-max. A frequency band between frequencies f1 and f2 has a half value. In this frequency band, the nearer the resonance point 14, the more easily the cantilever oscillates and the more slowly it damps. In the first operation of this embodiment, or the data acquisition process, the cantilever oscillating frequencies are at the opposite sides of the half value frequency band. outside the half value frequency band, the cantilever is slow to oscillate and is quick to damp. The oscillating frequency is set in the range where the cantilever is easy to damp. In this case, even when the amplitude of the cantilever varies with the uneven surface state of the specimen, the cantilever is quick to damp, and the amplitude of the cantilever changes but quickly becomes constant. Further, an amount of upward and downward movements of the specimen moving means can be controlled in accordance with the uneven surface state. Therefore, the data obtained on the basis of the moving amount of the specimen moving means can represent the uneven surface state of the specimen. In short, the uneven surface state of the specimen can be accurately measured.

Figure 4:
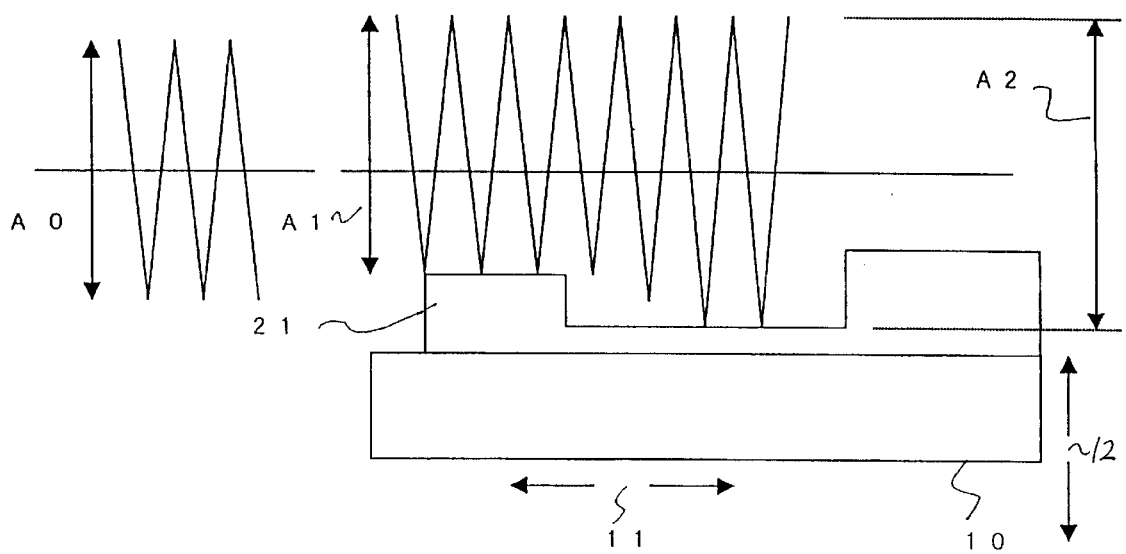
FIG. 4 shows the relationship between the probe and the specimen surface when measuring uneven surface states of the specimen using the scanning probe microscope.

FIG. 4 schematically shows the relationship between the amplitude of the cantilever and the surface of the specimen when the uneven surface state is measured in a vacuum in order that the amplitude of the cantilever remains constant. When the probe is not in contact with the surface of the specimen, the cantilever oscillates with amplitude A0. It is assumed that as the specimen is moved to the left by the scanning operation 11 of the specimen moving means 10, the probe comes into contact with a bump 21 of the specimen, and the cantilever oscillates with amplitude A1. The amplitude A1 is smaller than the amplitude A0. For convenience of explanation, the control operation is assumed to have started when the cantilever oscillates with the amplitude A1.

Figure 5:
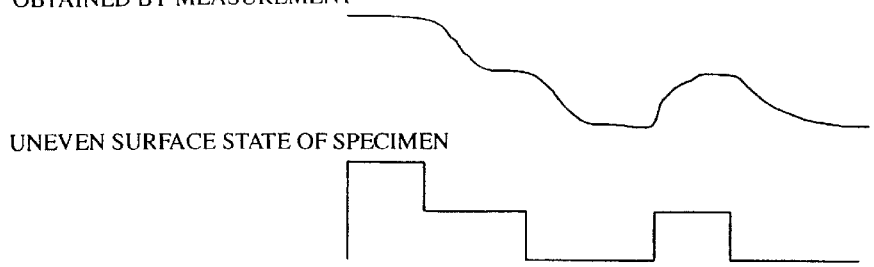
FIG. 5 shows uneven surface state data obtained by the scanning probe microscope when the cantilever is slow to damp.

The upward and downward movements 12 of the specimen moving means 10 are controlled during the scanning operation in order to make the amplitude A1 of the cantilever constant. Needless to say, the uneven surface state of the specimen is measured on the basis of the controlled amount of the upward and downward movements of the cantilever as described previously. The specimen is moved further to the left in response to the scanning operation. At the instant the probe leaves the right edge of the bump 21, there is no surface which is as high as the bump. Therefore, the amplitude of the cantilever varies from A1, but remains unstable since the cantilever is slow to damp. If the amplitude quickly becomes stable in this state, the amount to control the upward and downward movements of the specimen moving means can be determined. If the specimen is moved close to the probe by the specimen moving means until the amplitude of the cantilever becomes A1, height of Me bump can be determined on the basis of the controlled amount of the upward and downward movements. However, when passing over the right edge of the bump, the probe has suddenly nothing to come into contact with. As a result, the cantilever starts to oscillate with different amplitudes. Since there is no air resistance around the cantilever, the cantilever is slow to damp, so that te amplitude of the cantilever does not become constant immediately. Actually, the amplitude becomes A2 in a certain time period and remains constant when the probe comes into contact with a dent of the specimen. The amplitude A2 is compared with the target amplitude A1. The control amount of the specimen moving means is determined in order to make the amplitude A2 equal to the amplitude A1. Actually speaking, the operation for determining the control amount of the specimen moving means is continuously in progress, so that the control amount is determined on the basis of data obtained while the amplitude is reaching A2. In other words, the control amount of the upward and downward movements is determined even when the probe is not in contact with the specimen. The uneven surface state data obtained in accordance with the transient amplitude of the cantilever do not represent the actual surface shape of the specimen but are affected by the cantilever, which is slow to damp. For instance, the amplitude of the cantilever does not follow the uneven surface state of the specimen at leading and trailing edges of a bump since the cantilever is slow to damp. Since the control amount of the upward and downward movements is determined in a transiently delayed state, the obtained uneven surface state data differ from the actual surface shape of the specimen as shown in FIG. 5. In the vacuum, the oscillation of the cantilever is quick to damp since the cantilever oscillating frequency is outside the half value frequency band of the Q-curve in the first operation as shown in FIG. 3. Specifically, in a vacuum, the cantilever can easily oscillate due to the absence of air, and is slow to damp once it oscillates. In other words, the uneven surface state data can be as accurately obtained in the vacuum as in the air since the cantilever oscillating frequency is set outside the half value frequency band of the Q-curve.

In the second operation, or the measurement process, the probe is maintained spaced by the predetermined extent on the basis of the surface state data obtained in the first operation. Further, the cantilever oscillating frequency is changed to the frequency near the resonant point.

Figure 6:
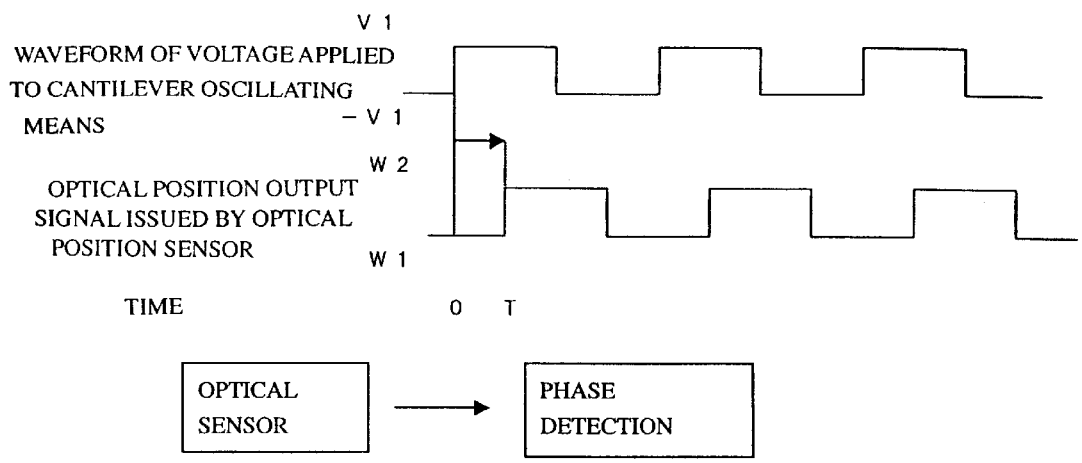
FIG. 6 shows the time delay (phase) caused when the probe leaves the specimen surface during measurements of a distribution of physical properties of the specimen surface using the scanning probe microscope.

FIG. 6 shows the time-dependent relationship between a waveform of voltages applied to the cantilever oscillating means and positions of optical position output signals detected by the optical position sensor. If there is no interaction between the probe and the specimen surface, the waveform of the applied voltages and optical position output waveform are free from time delays and are identical. However, the a probe and the specimen surface respond with the time delay because of electrostatic force, magnetic force or the like. It is assumed that a voltage V1 is applied in order to let the probe leave from the specimen surface, and that a voltage −V1 is applied in order to let the probe come close to the specimen surface. Further, it is assumed that an optical output signal W1 is issued in order to make the probe come close to the specimen surface and that an optical output signal W2 is issued in order to make the probe leave from the specimen surface. Since there is the foregoing interaction between the probe and the specimen surface, the optical position output signal W2 is issued after T seconds even if the applied voltage is V1. In other words, if the specimen surface has action force because of physical properties thereof, the probe tends to leave therefrom with a time delay (i.e. phase).

Levels of the physical properties of the specimen surface can be compared by detecting length of the time delay. When the probe is not in contact with the specimen surface, the cantilever oscillating frequency is determined outside the frequency band, which is the half value of the Q-curve. In such a case, even if the specimen surface affects the probe, the oscillating cantilever easily damps and is slow to resonate, which would adversely affect. high resolution measurements.

In the first operation, the probe comes into contact with the specimen surface, and the cantilever oscillating frequency is determined outside the frequency band, which is the half value of the Q-curve. As a result, the oscillating cantilever can be easily damped, so that uneven surface state data can be accurately obtained. In the second operation, since the probe is not in contact with the specimen surface, the cantilever oscillating frequency is changed to the frequency near the resonance point. Therefore, the cantilever quickly resonates, which enables accurate measurement of the physical properties of the specimen surface.

The physical properties of the specimen surfaces are a magnetic field, an electric field, physical action force and so on. For instance, a probe covered by a magnetic coat is subject to attraction and repulsion in accordance with a distribution of the magnetic force on the specimen surface during the second operation. The attraction or repulsion of the probe is detected as a phase difference. When phase signals are mapped with respect to an area to be measured, the scanning probe microscope can function as a magnetic force microscope, which can measure the magnetic field distribution of the specimen surface.

Further, a probe covered by a conductive coat undergoes attraction due to the electrostatic conduction in accordance with a potential distribution on the specimen surface in the second operation. The larger the potential distribution on the specimen surface, the larger attraction the probe is subject to. The attraction of the probe is detected as a phase difference. When phase signals are mapped with respect to an area to be measured, the scanning probe microscope can function as a potential force microscope, which can measure a potential distribution on the specimen surface.

Still further, a probe provided with a resin coat or a macromolecular ball is charged depending upon a material of the resin coat or macromolecular ball in accordance with a potential distribution on the specimen surface during the second operation. As a result, the probe is subject to the attraction and repulsion at different positions of the specimen surface. The probe measures the attraction or repulsion as a phase difference in accordance with a positive or negative potential on the specimen surface. When phase signals are mapped with respect to an area to be measured, the scanning probe microscope can function as a potential force microscope, which can measure a potential distribution on the specimen surface.

During the second operation, physical interaction force (e.g. van der Waals force or the like) of the specimen surface and the probe, which are not in contact with each other, can be detected as a phase difference, regardless of the conductive or resin coat on the probe. When phase signals are mapped with respect to an area to be measured, the scanning probe microscope can function as a physical force microscope, which can measure a distribution of physical interaction force of the specimen surface without touching the probe.

Figure 7:
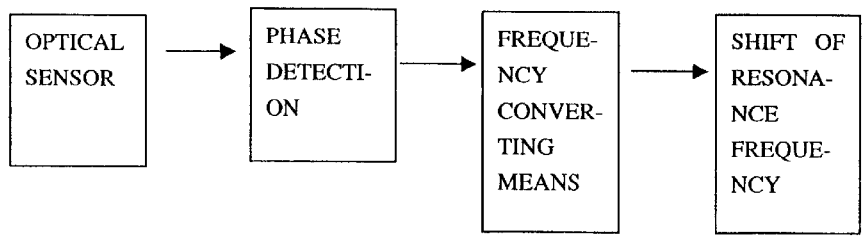
FIG. 7 shows how the frequency shift is measured on the basis of the time delay (phase) when the probe leaves the specimen surface during the measurements of a distribution of physical properties using the scanning probe microscope.

FIG. 7 shows how to obtain a frequency shift of the resonance point on the basis of phase signals, which are obtained by the procedure shown in FIG. 6. Further, a shift of a resonance frequency may be obtained on the basis of phase signals. When mapping the shift of the resonance frequency in the second operation, the scanning probe microscope can function as the magnetic, potential or physical action force microscope as described above.

The cantilever may not be oscillated in the second operation. In such a case, the cantilever is subject to non-contact restraints (e.g. electrostatic force, magnetic force or the like) due to physical properties of the specimen surface, and the laser beam reflecting surface of the cantilever is flexed. Receiving the attraction from the specimen surface, the probe comes close to the specimen. Conversely, when receiving the repulsion from the specimen surface, the probe tends to move away from the specimen. Physical properties of the specimen surface can be measured by detecting the flexibility of the laser beam reflecting surface using an optical head.

Both the first and second operations may be performed at respective points in an area to be measured. At a certain point, the second operation is carried out immediately after the first operation. At an adjacent point, the specimen and probe are relatively displaced, and the first and second operations are repeated as stated above. Uneven surface state data and physical property data of the specimen can be obtained by repeating the foregoing procedures.

Further, the first and second operations may be performed at each line in an area to be measured. At a certain line, the first operation is carried out in order to measure the uneven surface state of the specimen, and the obtained data are stored. Thereafter, at the same line, the second operation is performed with the probe spaced from the specimen surface on the basis of the stored uneven surface state data. At an adjacent line, the probe and the specimen are relatively displaced, and the first and second operations are performed as above. Uneven surface state data and physical property data of the specimen can be obtained by repeating the foregoing procedures.

The first and second operations may be performed for each frame in an area to be measured. First of all, the first operation is carried out for all of the frames. In this case, uneven surface state data are stored as two-dimensional data. Thereafter, the second operation is conducted with the probe spaced by a certain extent from the specimen on the basis of the stored two-dimensional data.

Further, the first operation may be performed for a frame of an area to be measured, thereby obtaining uneven surface state data. Thereafter, the probe is moved by the specimen moving means to the next point to be measured. The second operation may be performed at only this point in order to obtain physical property data of the specimen. During the second operation, either a magnetic or electric field may be applied to the specimen. By varying the intensity of the magnetic or electric field, it is possible to measure variations of physical property data of the specimen surface, which are obtained in the second operation.

FIG. 8 shows an example in which a measurement is performed in a vacuum. Laser beams 5 from a laser 61 are introduced into a vacuum container 63 via a window 62. Both the window 62 and the vacuum container 63 are airtight, and the vacuum container 63 is completely made void by a vacuum pump means 64. The vacuum container 63 houses a specimen stand 65, on which a cantilever 2, cantilever oscillating means 3 and specimen 9 are placed in a heated or cooled state, or at a room temperature. The specimen stand 65 is laterally and vertically moved by a specimen stand moving means 69. Laser beams are introduced into the vacuum container via the window, and are radiated onto the laser beam-reflecting surface of the cantilever 2. Reflected laser beams 7 reach, via the window, the optical position sensor 8, which is positioned outside the vacuum container 8. The amplitude of the cantilever is measured on the basis of the position of the reflected laser beam on the optical position sensor. In the first operation, when the probe comes into contact with the specimen surface, the amplitude of the cantilever is reduced. The cantilever is moved up and down in order to maintain the reduced amplitude in accordance with the scanning operation of the specimen moving means, so that uneven surface state data of the specimen can be obtained. In this case, the cantilever oscillating frequency is determined to be outside the frequency band having the half value of the Q-curve. Therefore, the cantilever can be easily damped and follow the uneven surface shape of the specimen, thereby obtaining uneven surface state data of the specimen. In the second operation, when a waveform of a voltage applied to the cantilever oscillating means 3 and an output signal of the optical position sensor 8 are measured, a time delay (phase) of the probe leaving the specimen can be measured. Since the time delay depends upon physical property values of the specimen surface, it is possible to measure a distribution of the physical properties.

The foregoing measurements can be conducted not only in the vacuum but also in the vacuum container, which is made void by the vacuum pump means and is then filled with a gas 68 to ambient air pressure. In this case, a moist gas may be introduced into the vacuum chamber. Further, a dry or moist gas may be continuously introduced into the vacuum chamber without making it void, and measurements may be performed at ambient air pressure 1.

The specimen may be put in a cell containing a solution, and is placed on the specimen moving means in order to perform measurements in the solution.

Measurements can be performed by applying a magnetic or electric field to the specimen perpendicularly, laterally or at a desired angle. Means for applying the magnetic or electric field may be positioned near the specimen, or outside the vacuum container. When applying the magnetic field, a coil may be placed near the specimen. The intensity of the magnetic field may be varied by applying varying currents to the coil. Further, the intensity of the magnetic field may be varied by changing the distance between the coil and the specimen using a permanent magnet. Next, when applying the electric field, a coil is placed near the specimen. Intensity of the electric field can be changed by applying varying currents to the coil. Further, an electrode plate may be placed near the specimen, and intensity of the electric field may be changed by applying varying currents to the electrode plate.

In the first operation, the cantilever oscillating frequency is determined to be outside the frequency band having the half value of the Q-curve of the amplitude and oscillation frequency of the cantilever. This is effective in damping the cantilever with ease, and enabling the probe to follow the uneven surface of specimen not only in the air but also in the vacuum, gas or solution. Therefore, the uneven surface state data can be accurately obtained. Further, in the second operation, the probe can be spaced from the specimen on the basis of the uneven surface state data, so that physical property data of the specimen can be obtained with tie probe spaced therefrom.

The present invention described above is advantageous in the following respects.

The scanning probe microscope comprises a cantilever having a minute probe at one end thereof, a laser radiating laser beams to a laser beam reflecting surface of the cantilever, an optical position sensor detecting positions of reflected laser beams, specimen moving means moving a specimen, and cantilever oscillating means periodically oscillating the cantilever with a predetermined amplitude. The scanning probe microscope performs: a first operation in which if the optical position sensor detects a reduced amplitude when the probe of the cantilever comes into contact with the specimen, uneven surface state data of the specimen are obtained on the basis of a control amount of upward and downward movements of the specimen moving means which is moved upward or downward in order to maintain the reduced amplitude constant, and a second operation in which physical operation data of the specimen are obtained by keeping the probe spaced by a predetermined extent from the specimen on the basis of the uneven surface state data obtained by the first operation. In the first operation, the uneven surface state data are obtained by oscillating the cantilever with an oscillation frequency outside the frequency band, which is half of a value of a dependent curve (Q-curve) of a cantilever oscillating frequency and amplitude. This arrangement enables the cantilever to damp with ease, and assures accurate measurements of uneven surface state data. In the second operation, the probe is spaced from the specimen with a predetermined extent on the basis of the uneven surface state data obtained in the first operation, which enables physical property data of the specimen surface to be accurately obtained.

What is claimed is:

1. A method of operating a scanning probe microscope having a cantilever having a minute probe at one end thereof and a reflective surface portion, a laser beam radiating device for radiating laser beans onto the reflective surface portion of the cantilever, an optical position sensor for detecting positions of laser beams reflected by the reflective surface portion, specimen moving means for moving a specimen relative to the probe, and cantilever oscillating means for periodically oscillating the cantilever at a predetermined amplitude, the method comprising the steps of:

performing a first operation in which the specimen is moved relative to the probe and uneven surface data of the specimen surface is obtained when the optical position sensor detects a reduced amplitude of the cantilever smaller than the predetermined amplitude during the relative movement when the probe comes into contact with the specimen, the uneven surface data being obtained by controlling the specimen moving means to move the specimen relative to the probe in upward or downward directions in order to maintain the reduced amplitude constant; and performing a second operation in which physical action force data of the specimen is obtained by causing relative movement of the specimen and the probe while keeping the probe spaced by a predetermined distance from the specimen on the basis of the uneven surface data obtained in the first operation;

wherein, in the first operation, the uneven surface data is obtained by controlling the oscillating means so that the cantilever is oscillated outside a frequency band defined by one-half the value of a dependent curve of the cantilever oscillating frequency and amplitude and, in the second operation, the cantilever is oscillated with a frequency near a resonant point of the dependent curve of the cantilever oscillating frequency and amplitude.

2. A method of operating a scanning probe microscope having a cantilever having a minute aperture at one end thereof and a reflective surface portion, a laser beam radiating device for radiating laser beams onto the reflective surface portion of the cantilever, an optical position sensor for detecting positions of laser beams reflected by the reflective surface portion, specimen moving means for moving a specimen relative to the probe, and cantilever oscillating means for periodically oscillating the cantilever at a predetermined amplitude, the method comprising the steps of:

performing a first operation in which the specimen is moved relative to the probe and uneven surface data of the specimen is obtained when the optical position sensor detects a reduced amplitude of the cantilever smaller than the predetermined amplitude during the relative movement when the probe of the cantilever comes into contact with the specimen, the uneven surface state data being obtained by controlling the specimen moving means to move the specimen relative to the probe in upward or downward directions in order to maintain the reduced amplitude constant; and performing a second operation in which physical action force data of the specimen is obtained by causing relative movement of the specimen and the probe while keeping the probe spaced by a predetermined distance from the specimen on the basis of the uneven surface state data obtained by the first operation;

wherein, in the first operation, the uneven surface data is obtained by oscillating the cantilever with an oscillation frequency outside a frequency band which is defined by one-halt the value of a dependent curve of the cantilever oscillating frequency and amplitude and, in the second operation, flexibility of the cantilever is measured by moderately oscillating the cantilever while causing relative movement of the specimen and the probe.

3. A method of operating a scanning probe microscope according to claim 1; further comprising the steps of using p phase sensor to detect a signal generated in response to a time delay in oscillations of the cantilever caused by interactions of the specimen surface and the probe; and measuring a difference in at least one physical property of the specimen surf ace selected from a magnetic field, an electric field or a physical action force on the basis of the detected signal.

4. A method of operating a scanning probe microscope according to claim 1; further comprising the steps of using a phase sensor to detect a signal generated in response to a time delay in oscillations of the cantilever caused by interactions of the specimen surface and the probe; and measuring a difference in at least one physical property of the specimen surface selected from a magnetic field, an electric field or a physical action force on the basis of a signal which is generated in accordance with a shift amount of a resonance frequency of the cantilever and is detected by the phase sensor.

5. A method of operating a scanning probe microscope according to claim 1; wherein the first and second operations are performed at each of a plurality of measurement points on the specimen surface.

6. A method of operating a scanning probe microscope according to claim 1; wherein the first and second operations are performed at each of a plurality of measurement lines along the specimen surface.

7. A method of operating a scanning probe microscope according to claim 1; wherein the first and second operations are performed by causing relative scanning movement of the probe relative to the specimen surface throughout each of a plurality of frames of the specimen surface.

8. A method of operating a scanning probe microscope according to claim 1; wherein the first and second operations are performed with the specimen exposed to air.

9. A method of operating a scanning probe microscope according to claim 1; further comprising the steps of providing a cell containing therein a solution, placing the specimen in the solution, and performing the first and second operations with the specimen placed in the solution.

10. A method of operating a scanning probe microscope according to claim 1; further comprising the steps of providing a vacuum container and vacuum pumping means, and performing the first and second operations with the specimen located in the vacuum container under a vacuum produced by the vacuum pumping means.

11. A method of operating a scanning probe microscope according to claim 1; further comprising the steps of providing a vacuum container, placing the specimen in the vacuum container, evacuating the vacuum container, and then filling the vacuum container with a gas, and performing the first and second operations with the specimen placed in the gas.

12. A method of operating a scanning probe microscope according to claim 8; further comprising the step of providing means f or heating or cooling the specimen, and performing the first and second operations with the specimen being in a heated or cooled state.

13. A method of operating a scanning probe microscope according to claim 8; further comprising the steps of providing means for applying a magnetic field to the specimen, and performing the first and second operations with the specimen disposed in a magnetic field.

14. A method of operating a scanning probe microscope according to claim 8; further comprising the steps of providing means for applying an electric field to the specimen, and performing the first and second operations during the application of the electric field.

15. A method of operating a scanning probe microscope having a cantilever with a probe at one end thereof, the method comprising the steps of:

performing a data acquisition process by oscillating the cantilever at a frequency offset from a resonant frequency thereof, causing the probe to undergo relative scanning movement with respect to a specimen so that the cantilever undergoes oscillation at a reduced amplitude when the probe comes into contact with the specimen, maintaining the reduced amplitude constant by causing the cantilever to nova toward or away from the specimen, and obtaining surface state data of the specimen on the basis of movement of the cantilever toward or away from the specimen; and performing a measurement process by oscillating the cantilever near a resonant frequency thereof, causing the probe to undergo relative scanning movement with respect to the specimen, and obtaining physical data of the specimen by maintaining the probe at a predetermined distance from the specimen on the basis of the surface state data.

16. A method of operating a scanning probe microscope according to claim 15; wherein the step of performing the data acquisition process includes the step of oscillating the cantilever at a frequency outside a frequency band which is defined by one-half the value of a dependent curve of the cantilever oscillating frequency versus amplitude, and the step of performing the measurement process includes the step of oscillating the cantilever at a frequency near a resonant point of the dependent curve of the cantilever oscillating frequency versus amplitude.

17. A method of operating a scanning probe microscope according to claim 15; further comprising the steps of using a phase sensor to produce a phase signal in response to a time delay in oscillation of the cantilever caused by interaction of the specimen surface and the probe; and measuring a physical property of the specimen surface on the basis of the phase signal.

18. A method of operating a scanning probe microscope according to claim 15; wherein the data acquisition process and the measurement process are performed with the specimen exposed to air.

19. A method of operating a scanning probe microscope according to claim 15; wherein the data acquisition process and the measurement process are performed with The specimen maintained in a vacuum.

20. A method of operating a scanning probe microscope according to claim 15; wherein the data acquisition process and the measurement process are performed with the specimen placed in a solution.

* * * * *